US009941600B2

(12) United States Patent
Tran et al.

(10) Patent No.: US 9,941,600 B2
(45) Date of Patent: Apr. 10, 2018

(54) ULTRA LOW PROFILE CONFORMAL ANTENNA SYSTEM

(71) Applicant: QUALCOMM Incorporated, San Diego, CA (US)

(72) Inventors: Allen Minh-Triet Tran, San Diego, CA (US); Ernest Tadashi Ozaki, Poway, CA (US); Mohammad Ali Tassoudji, San Diego, CA (US); Ahmad Jalali, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1093 days.

(21) Appl. No.: 14/060,502

(22) Filed: Oct. 22, 2013

(65) Prior Publication Data

US 2015/0249293 A1 Sep. 3, 2015

Related U.S. Application Data

(60) Provisional application No. 61/818,659, filed on May 2, 2013.

(51) Int. Cl.

| | |
|---|---|
| ***H04B 7/00*** | (2006.01) |
| ***H01Q 25/00*** | (2006.01) |
| ***H01Q 1/28*** | (2006.01) |
| ***H01Q 13/28*** | (2006.01) |
| ***H01Q 19/06*** | (2006.01) |
| ***H01Q 21/20*** | (2006.01) |
| ***H01Q 3/24*** | (2006.01) |
| ***H01Q 3/26*** | (2006.01) |
| ***H01Q 13/02*** | (2006.01) |
| *H01Q 3/36* | (2006.01) |

(52) U.S. Cl.

CPC ............. *H01Q 25/00* (2013.01); *H01Q 1/286* (2013.01); *H01Q 3/24* (2013.01); *H01Q 3/26* (2013.01); *H01Q 13/02* (2013.01); *H01Q 13/28* (2013.01); *H01Q 19/06* (2013.01); *H01Q 21/205* (2013.01); *H01Q 3/36* (2013.01)

(58) Field of Classification Search

CPC ................................ H04B 7/10; H04W 16/28

USPC .......... 342/81, 154, 367, 371, 373; 343/708, 343/757, 762

See application file for complete search history.

(56) References Cited

U.S. PATENT DOCUMENTS

| | | | |
|---|---|---|---|
| 2,929,065 | A | 3/1960 | Kreinheder |
| 2,993,205 | A | 7/1961 | Cooper |
| 4,931,808 | A | 6/1990 | Lalezari et al. |
| 7,071,879 | B2 | 7/2006 | Strickland |

(Continued)

FOREIGN PATENT DOCUMENTS

| | | | |
|---|---|---|---|
| EP | 2575211 | A1 | 4/2013 |
| GB | 1194399 | A | 6/1970 |

OTHER PUBLICATIONS

International Search Report and Written Opinion—PCT/US2014/035737—ISA/EPO—Jan. 22, 2015.

*Primary Examiner* — Dao L Phan

(74) *Attorney, Agent, or Firm* — Paradice and Li LLP/Qualcomm

(57) ABSTRACT

A low profile conformal high gain multi-beam aircraft antenna includes antenna elements supported by a ground plane to create the low profile conformal high gain multi-beam aircraft antenna. Some of the antenna elements include a feeding waveguide flared in at least one of an h-plane and a v-plane. The antenna elements cooperate to create a gain pattern near a plane of the antenna.

35 Claims, 7 Drawing Sheets

(56) References Cited

U.S. PATENT DOCUMENTS

| | | | |
|---|---|---|---|
| 7,400,304 | B2 | 7/2008 | Lewis et al. |
| 2005/0219126 | A1 | 10/2005 | Rebeiz et al. |
| 2006/0229070 | A1 | 10/2006 | de La Chapelle et al. |
| 2012/0200458 | A1 | 8/2012 | Jalali et al. |

ULTRA LOW PROFILE CONFORMAL ANTENNA SYSTEM

CROSS-REFERENCE TO RELATED APPLICATION

This application claims the benefit under 35 U.S.C. Section 119(e) and commonly-assigned U.S. Provisional Patent Application No. 61/818,659, filed on May 2, 2013, in the names of Tran et al., entitled "ULTRA LOW PROFILE CONFORMAL ANTENNA SYSTEM," the disclosure of which is expressly incorporated by reference herein in its entirety.

BACKGROUND

Field

Aspects of the present disclosure relate to air-to-ground communication systems, and more particularly to an air-to-ground communications system adapted for use with an airborne mobile platform that provides an ultra-low profile conformal aircraft antenna.

Background

Wireless communication networks are widely deployed to provide various communication services such as telephony, video, data, messaging, broadcasts, and so on. Such networks, which are usually multiple access networks, support communications for multiple users by sharing the available network resources. Such networks are terrestrial-based networks, however, in recent years, publicly accessible networks are being made available for passengers on commercial air transportation, e.g., airplanes and other aircraft.

Such services are known as air-to-ground (ATG) communication services, and may provide such services as broadband data, voice communication, and entertainment such as streaming movies or music. Although ATG services and networks are similar to currently deployed terrestrial cellular and other wireless networks, there are aspects of ATG networks that differ from these networks.

As aircraft fly across a geographic region, each aircraft is serviced by a particular base transceiver station (BTS) until signal quality, signal strength, or available bandwidth from that BTS is insufficient, at which time service is transferred to another BTS. Such a transfer can be referred to a "handoff," similar to handoffs that occur in terrestrial cellular networks for cellular devices (handsets, PDAs, etc.) when such devices are mobile.

Aircraft may use a single transceiver having an antenna mounted on the undercarriage of the aircraft to communicate with the BTS. However, BTS antenna patterns are usually designed to service terrestrial customers, and the beam patterns at a given BTS are usually not arranged to service ATG communications traffic.

Current generation satellite communications systems offering broadband internet service to commercial jetliners specify sophisticated high gain *agile* beam antennas to initiate and maintain the communications link to the satellites. These antennas are large, complex, and expensive, and involve large surface areas and volumes on the aircraft fuselage, adding to installation costs.

Capacity for these systems is limited. Launching new satellites to accommodate capacity growth can be prohibitively expensive. Generally, these costs are passed on to the consumer in the form of high service fees. The present disclosure describes aspects of a low cost aircraft antenna solution that supports an air to ground communications system. The system offers broadband internet service that is similar to or exceeds that of the more expensive satellite based systems, but at a fraction of the cost of current antenna technologies servicing these sat-com based systems.

Merely replicating terrestrial cellular beam patterns or satellite antenna beam patterns around the aircraft in an omnidirectional pattern, however, would provide insufficient signal strength and capacity to service the thousands of aircraft and potentially hundreds of thousands of users in such an ATG system. Replicating the terrestrial beam patterns would also create interference patterns that could be deleterious to communications links in ATG systems as well as other aircraft communications systems.

As aircraft travel through a particular BTS service area, or are handed off to another BTS service area, the aircraft antenna may also need to change beam patterns or beam directions. The change provides continuous service during aircraft flight, which may not have been needed or have as stringent tracking accuracy as with satellite communications links. Federal Communication Commission (FCC) rules may also prohibit certain portions of the flight from providing communications services. FCC rules may prevent transmissions in specific terrestrial directions that may not have been at issue when the transmissions were directed to higher elevations.

Further, adding additional externally mounted items to an aircraft fuselage affects aircraft flight characteristics, which makes implementation of external aircraft antennas difficult for ATG systems.

SUMMARY

In an aspect of the present disclosure, a low profile conformal high gain multi-beam aircraft antenna includes antenna elements supported by a ground plane to create the low profile conformal high gain multi-beam aircraft antenna. One or more of the antenna elements includes a feeding waveguide flared in at least one of an h-plane and a v-plane. The antenna elements cooperate to create a gain pattern near a plane of the antenna.

In another aspect of the present disclosure, a low profile conformal high gain multi-beam aircraft antenna includes means for receiving a signal. The receiving means is supported by a ground plane means for creating the low profile conformal high gain multi-beam aircraft antenna. The receiving means includes a waveguide means flared in at least one of an h-plane and a v-plane. The receiving means cooperate to create a gain pattern near a plane of the antenna. The low profile conformal high gain multi-beam aircraft antenna also includes means for mounting the antenna to an aircraft.

In another aspect of the present disclosure, a method for wireless communication within a communications system uses a low profile conformal high gain multi-beam aircraft antenna. The method includes creating a gain pattern near a plane of the antenna elements supported by a ground plane. The antenna elements include a feeding waveguide flared in at least one of an h-plane and a v-plane. The antenna elements cooperate to create the gain pattern near a plane of the antenna.

In another aspect of the present disclosure, a computer program product configured for wireless communication within a communications system using a low profile conformal high gain multi-beam aircraft antenna includes a non-transitory computer-readable medium having non-transitory program code recorded thereon. The non-transitory program code includes program code to create a gain pattern near a plane of the antenna elements supported by a ground plane. The antenna elements include a feeding waveguide flared in at least one of an h-plane and a v-plane. The antenna elements cooperate to create the gain pattern near a plane of the antenna.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR."

Figure 1:
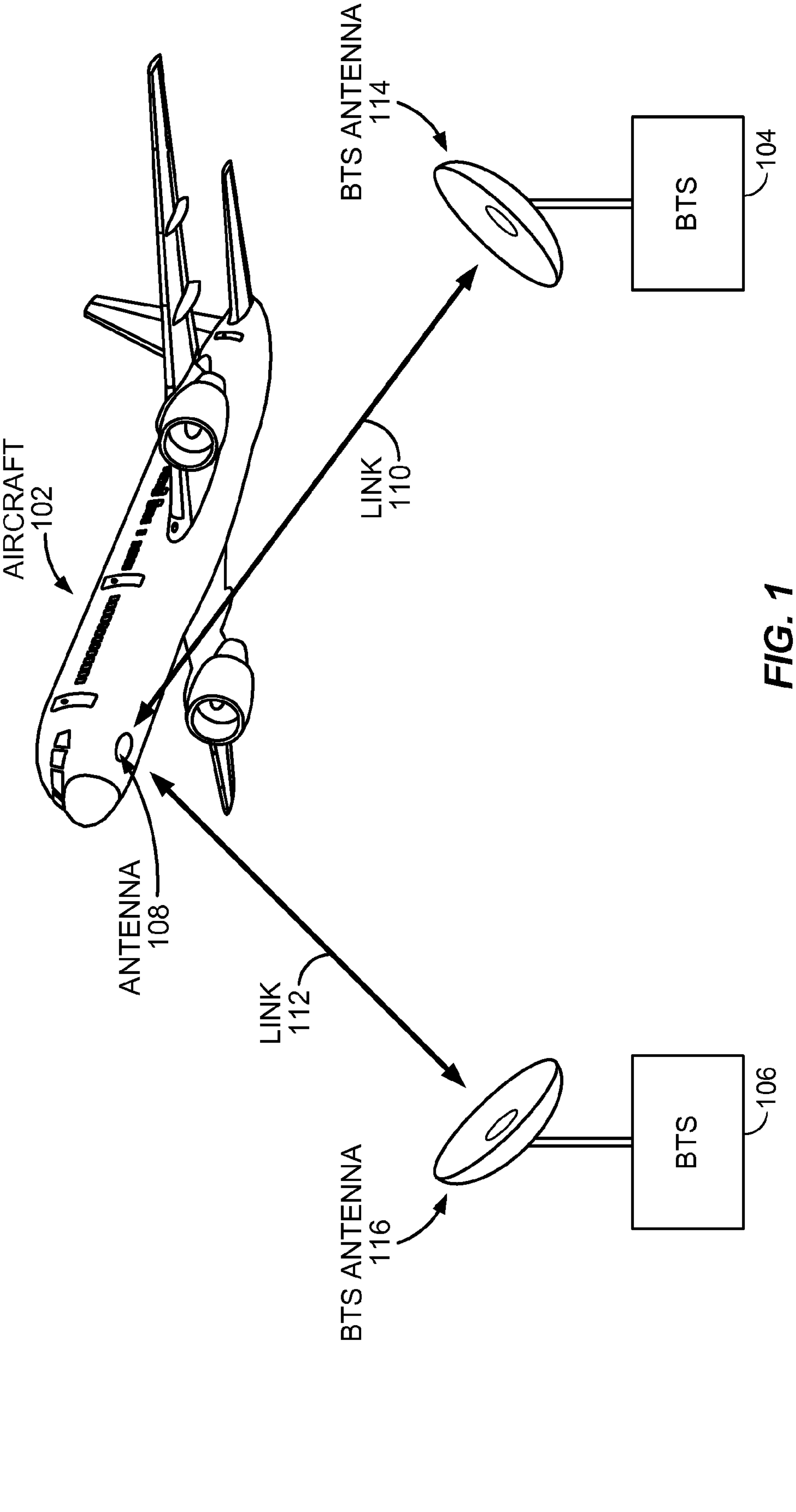
FIG. 1 illustrates a diagram of an example of an air-to-ground telecommunications system.

FIG. 1 illustrates a diagram of an example of an air-to-ground wireless system. An air-to-ground wireless system 100, as shown, includes an aircraft 102 and multiple base transmission stations (BTS) 104-106. Although the aircraft 102, the BTS 104 and the BTS 106 are shown for clarity, any number of aircraft, the BTS 104 and the BTS 106 can be implemented within the scope of the present disclosure.

The aircraft 102 has an aircraft antenna 108 that is used for communication with one or more of the BTS 104 and the BTS 106 via a communication link 110 and/or a communication link 112 via a BTS antenna 114 and/or a BTS antenna 116. As the aircraft 102 flies overhead via a predefined route at regulated altitudes, the aircraft 102 will enter and leave the service area for BTS 104 and/or BTS 106, as well as any other BTSs 104/106 that are in a geographically proximate area. Terrestrial cellular systems adapted for ATG service use a wide beam width (e.g., the BTS antenna 114 and/or the BTS antenna 116) to service the aircraft 102 via the aircraft antenna 108. The wide beam width in used in an attempt to provide voice and low-speed data services to cellular telephones or other mobile devices (not shown) that are onboard the aircraft 102. Such an approach, however, may not have sufficient bandwidth or power to properly maintain the communication link 110 or the communication link 112 to service the aircraft 102 or other aircraft that are in the geographic service area for the BTS 104 and/or the BTS 106.

Aspects of the present disclosure provide support for the communication link 110 and the communication link 112 with higher frequencies to increase the bandwidth provided to the aircraft 102 from the BTS 104 and/or the BTS 106. The higher frequencies enable a higher data rate service to the aircraft 102, as well as other aircraft in the geographic service areas of the BTS 104 and/or the BTS 106.

Figure 2:
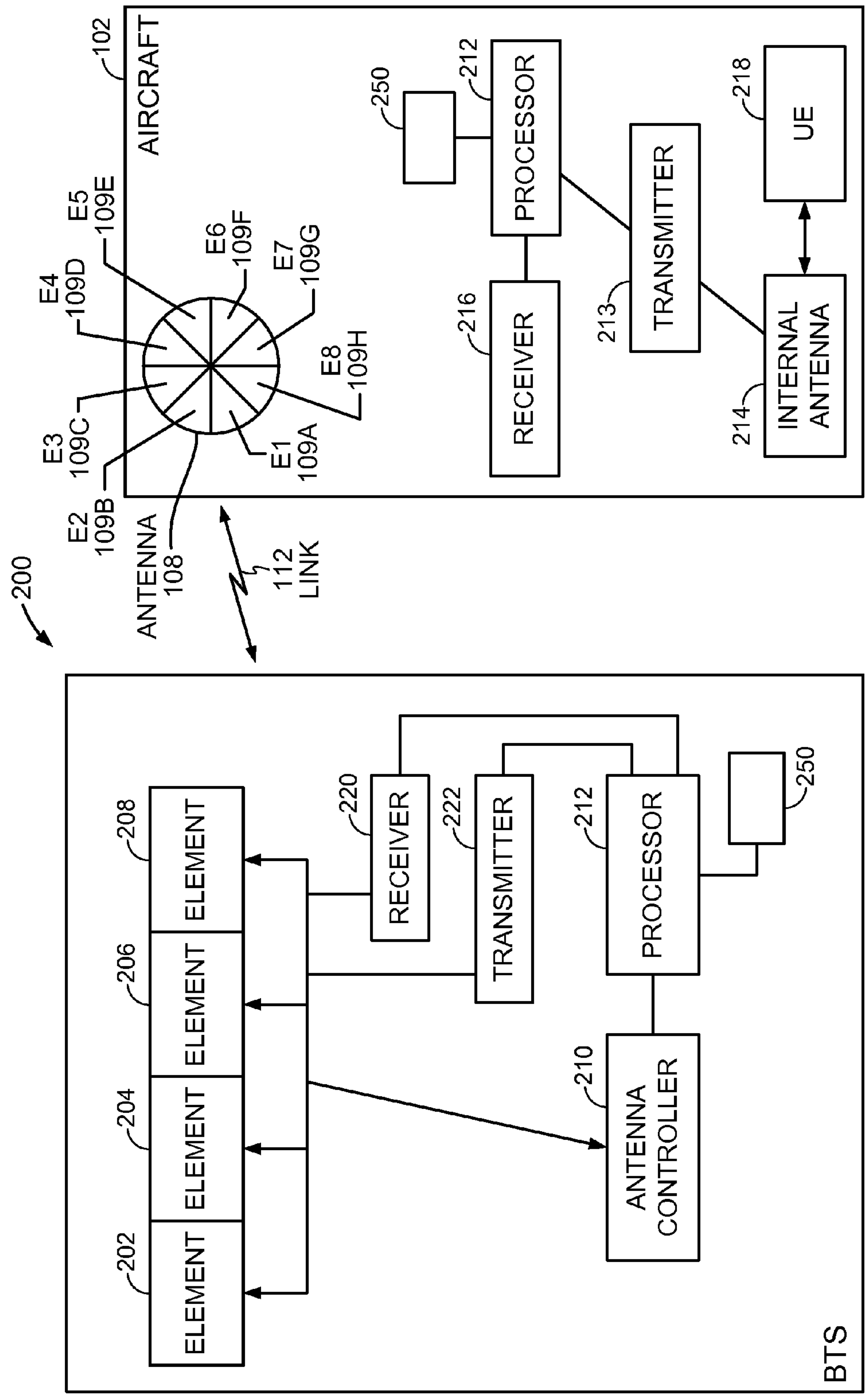
FIG. 2 illustrates a base transmitting station antenna in accordance with one or more aspects of the present disclosure.

FIG. 2 illustrates a base station transmitting antenna in accordance with one or more aspects of the present disclosure. An antenna 200 (illustrated as the BTS antenna 114 and/or the BTS antenna 116 in FIG. 1) can be a steerable beam antenna, implemented as a phased array antenna having antenna elements 202, 204, 206 and 208. Other steerable beam antennas, such as tracking antennas, are envisioned as within the scope of the present disclosure. Further, the aircraft antenna 108 may have elements E1 109A, E2 109B, E3 109C, E4 109D, E5 109E, E6 109F, E7 109G, and E8 109H, or some other number of elements, as part of a steerable antenna or a switchable antenna, without departing from the scope of the present disclosure.

The air-to-ground wireless system 100 of the present disclosure may use microwave spectrum currently used by very small aperture terminal (VSAT) uplinks. VSAT uplinks may be in the Ku-band of frequencies at approximately 12-14 GHz, although they can also be in other frequency ranges and bands without departing from the scope of the present disclosure. To enable this spectrum reuse without degrading other uses of VSAT frequencies in other systems, e.g., maritime VSAT, other previously-deployed VSAT systems, etc., aspects of the present disclosure control the antenna patterns of the BTS antenna 114 and the BTS antenna 116, as well as the antenna pattern of the aircraft antenna 108. The control is to reduce interference between the air-to-ground wireless system 100 and VSAT systems.

To further enable the air-to-ground wireless system 100, the BTS antenna 114 and/or the BTS antenna 116 uses very narrow transmission beams, sometimes called "pencil" beams. Pencil beams may have main power lobes of the beam pattern that are on the order of 1 degree by 2 degrees for supporting spatial multiplexing gain where the VSAT spectrum is reused for multiple aircraft from each BTS 104-106. This spatial multiplexing utilizes these very well defined beams by reducing interference, also referred to as "bleed over," from one beam to any other beam within the air-to-ground wireless system 100. The BTS uses these beams to transmit communications signals to aircraft and to receiver communications signals from aircraft.

To track multiple aircraft (e.g., aircraft 102) as they move across the field of view of the BTS antenna 114-116, each of the aircraft 102 is illuminated with a narrow pencil beam formed by the antenna elements 202-208. These beams are used to establish the communication link 110 (or the communication link 112), and these links are maintained by an antenna controller 210. In this configuration, the antenna controller 210 controls the phase and amplitude coefficients of signals that drive each of the antenna elements 202-208 to form and manipulate the beams used for the communication link 110. The processor 212 is coupled to the antenna controller 210, the transmitter 222, and the receiver 220 at the BTS 104-106. The processor 212 may direct the formation of many beams over the communication link 110 depending on the amplitude and phase coefficients for a given signal to be transmitted or a given signal being received at the BTS 104 and/or the BTS 106 based on beam formation program code 250. The signals contained in those beams include reference signals, which are known by both the transmitter and the receiver. The reference signals are intended to enable measurement of the signal. These reference signals are also known as pilots or pilot signals.

The aircraft 102 operates similarly, in that the communication link signals are sensed at the aircraft antenna 108 and received at the aircraft receiver 216. These signals are processed by the processor 212, which may be a similar or different processor than the processor 212 at the BTS 104 and/or the BTS 106. The signals are then transmitted in the aircraft 102 by the transmitter 213. The internal antenna 214 transmits these signals to a user equipment 218 (UE), such as a cellular telephone and/or PDA device, which then transmits back to the internal antenna 214. These signals are then received by the transmitter 213 and processed by the processor 212, and then retransmitted by the transmitter 213 through the aircraft antenna 108 back to the BTS 104 and/or the BTS 106.

In essence, the antenna 200 creates pencil beams through the use of the antenna 200 (e.g., a phased array) made up of antenna elements 202-208 that are energized in particular phase and amplitude configurations to follow the aircraft 102 as it moves. Mechanical stress, thermal and local scattering effects affect the communication link 110 and the communication link 112. These effects also distort the beam pattern of the antenna 200, which reduces the performance of the air-to-ground wireless system 100 by increasing the power in the side lobes of the antenna beam created by the antenna 200. Because the beam from the antenna 200 is fully formed and measurable at a considerable distance from the antenna 200, possibly several meters from the antenna 200 itself because of the high gain of the antenna 200 beam, sampling the beam close to the antenna (e.g., in the near field) is problematic.

Further, atmospheric conditions between the BTS 104-106 and the aircraft antenna 108 of the aircraft 102 may affect the beam, causing it to distort or diverge from the determined path, which affects the performance of the communication link 110. The distortion or divergence effects may include beam squint, beam size distortion, or other effects, any of which reduces the bandwidth available for data/voice transmission between the BTS 104-106 and the aircraft antenna 108. The antenna 200 can compensate for these effects by adjusting the phase and amplitude of the drive to each of the antenna elements 202-208, but when there is some ability to determine the shape of the beam formed by antenna 200 at an appropriate distance from the antenna. The aircraft antenna 108 should also be able to provide beams of sufficient gain and directional control to maintain communications with BTS 104 and BTS 106.

In a communications system that uses a phased array antenna to provide antenna gain, the precise adjustment of the amplitude and phase coefficients is not critical if the system employs one beam. When the communications system uses the multiple beams possible with a phased array antenna, and the beams provide spatial multiplexing to multiple users of the system, the adjustment of the coefficients becomes more important. This precise adjustment of coefficients is known as calibration of the phased array.

An aspect of the present disclosure includes a very low profile (may be less than 0.4 inch thick) antenna design, with elements mounted on a ground plane. The antenna may be mounted conformal to the aircraft body or to that of other vehicles with reduced or even minimal air resistance. This saves fuel and has fewer effects on aircraft flight characteristics. Further, in another aspect of the present disclosure, the antenna may be designed to provide a specified radiation pattern for the elevation angles near the horizon to allow for meeting FCC and other signal transmission constraints.

Figure 3A:
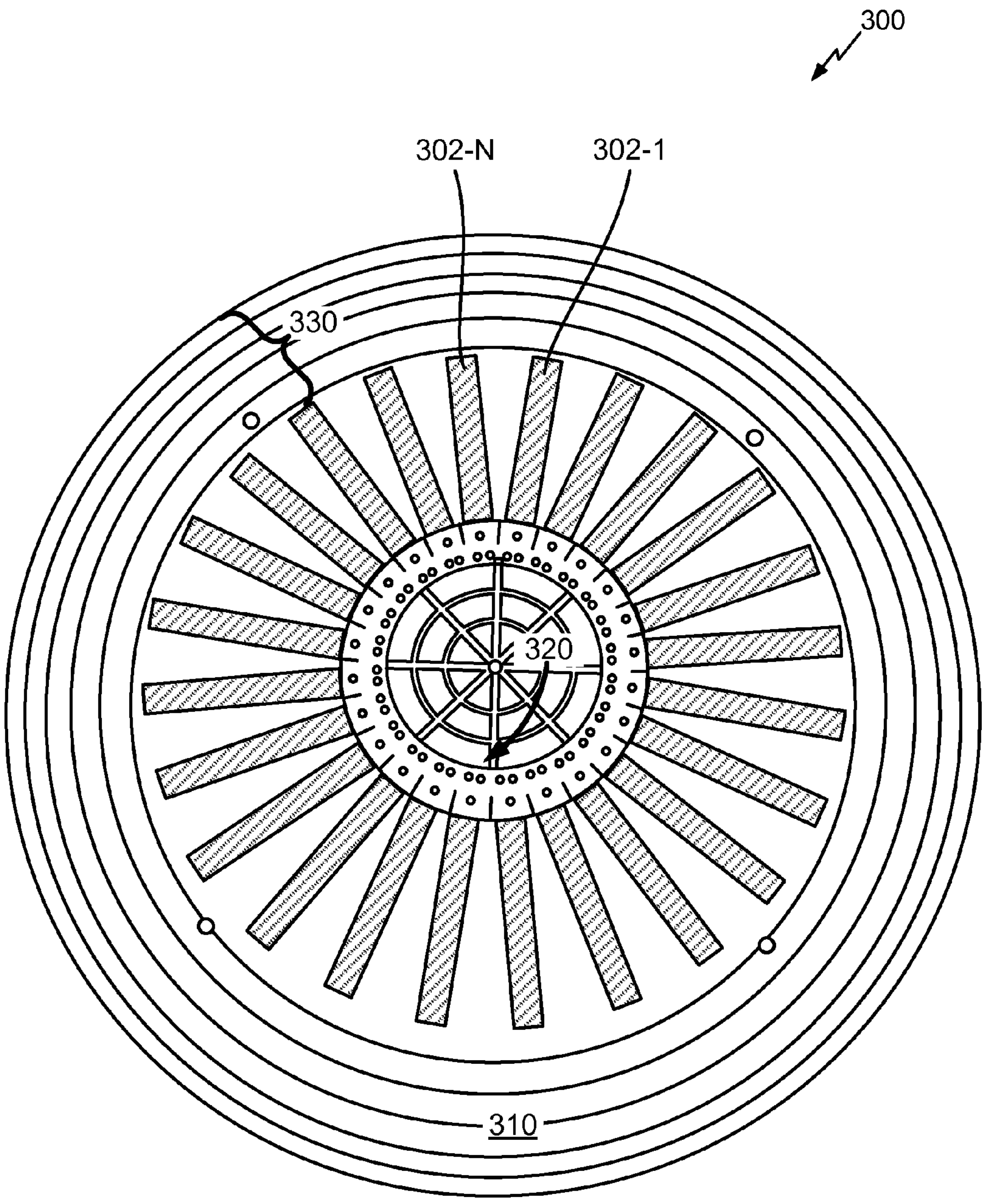
FIGS. 3A through 3D illustrate conformal antenna structures that may be deployed in an air-to-ground broadband communications system in accordance with one or more aspects of the present disclosure.

FIG. 3A illustrates a conformal antenna structure 300 that may be deployed in an air-to-ground broadband communications system in accordance with aspects of the present disclosure. A circular array of 24 elements installed on a ground plane is shown although fewer or more elements could be used. Representatively, antenna elements 302 (302-1 . . . 302-N) may be arranged in a pattern, which may be a circular pattern, to provide 360-degree coverage in the azimuth plane. The pattern is not limited to a circular shape. As further illustrated in FIG. 3B, each antenna element 302 may include a feed waveguide 304 and a piece of dielectric material 306 with specified dielectric properties and dimensions. Alternatively, an additional element, such as a groove or conductive structure, is specifically shaped and directed to provide the specified antenna radiation pattern coverage and/or gain pattern.

As shown in FIG. 3A, the antenna elements 302 may be arranged in a substantially circular pattern on the ground surface 310, and the conformal antenna structure 300 gain pattern may cover some continuous portion or multiple portions of 360 degrees in an azimuth plane, 360 degrees in an azimuth plane, or more than 360 degrees in an azimuth plane.

The ground surface 310 of the conformal antenna structure 300, which may be a ground plane, may be a conductive surface, and is illuminated by radio frequencies from feed waveguides 304 from one side of the ground surface 310 or from a center of the ground surface 310 radially outward. The ground surface 310 of the conformal antenna structure 300 may be directly mounted to the aircraft 102, or other devices may be used to mount the aircraft antenna 108 to the aircraft 102. Such devices may electrically isolate the aircraft antenna 108 from the aircraft 102.

The feed waveguides 304 that direct the electromagnetic energy, either in transmission from the aircraft 102 or received at the aircraft 102, may be flared in at least one direction of the waveguide. These directions of the feed waveguides 304 are usually called the horizontal plane (h-plane) and the vertical plane (v-plane) of the feed waveguides 304. By flaring or otherwise shaping the h-plane and the v-plane of the feed waveguides 304, the electromagnetic energy may be directed into the dielectric material 306 (or other element such as a groove or conductive structure) on the ground surface 310.

Figure 3B:
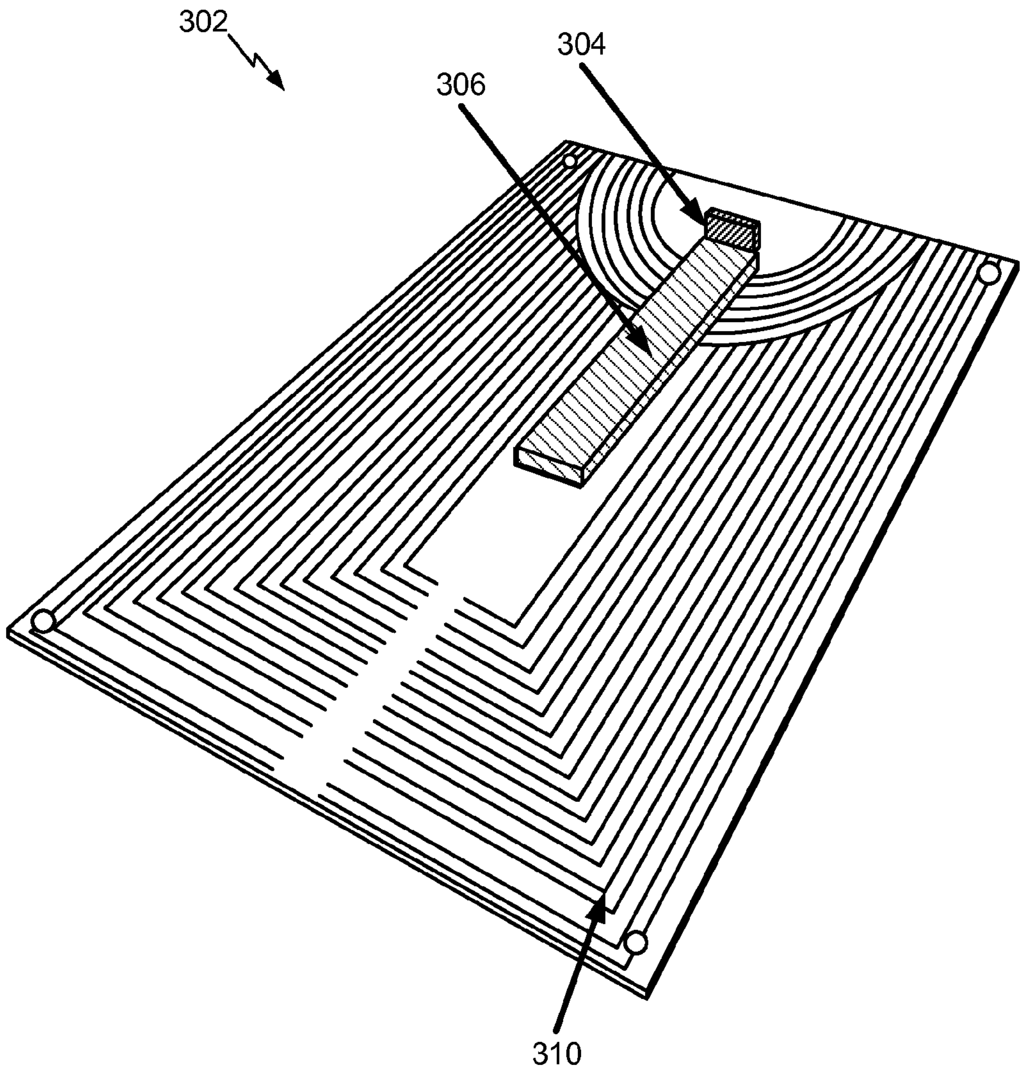

FIG. 3B shows an individual one of the antenna elements 302. Each of the antenna elements transmits/receives signals from transceivers 320 (FIG. 3A shows one of the transceivers). In addition, the waves are launched from the feed waveguides 304 along a dielectric material 306 (or substantially transverse to a groove or other structure on the ground surface 310) of the antenna elements 302. The distance 330 between the end of the dielectric material of the antenna elements 302 and the end of the ground surface 310 helps define the antenna beam pattern for each of the waveguides. Rather than defining the beam solely by the shape of the ground surface 310 of the conformal antenna structure 300, a radio frequency choke may also be installed at a specified distance from the end of the dielectric material 306 of the antenna elements 302. The radio frequency choke may also be installed at a specified distance from an element (e.g., groove, conductive structure, dielectric material, etc.) launching the wave, such that the antenna beam may be formed in a conformal manner rather than a planar manner.

The shape and dielectric constant of the dielectric material 306 affect the aircraft antenna 108 beam pattern and/or gain in the azimuth direction (the yaw plane of an aircraft 102). The shape of the ground surface 310 affects the beam shape and/or gain in the elevation plane of the aircraft antenna 108 (the roll plane of an aircraft 102). The elevation angles that are specified for aircraft antennas 108 for ATG communications may be −3 degrees (the wings of an aircraft define 0 degrees, and a negative value of elevation defines space below the wing plane) to −20 degrees. Of course, other elevation angles are possible based on the shape of the ground surface 310, the dielectric material, and location of the aircraft antenna 108 with respect to the aircraft fuselage.

Adjacent ones of the antenna elements 302-1 and 302-N may involve some beam-to-beam isolation such that when waves from adjacent elements are launched, the interference between transmissions (often called co-channel interference) is reduced. Within this aspect of the present disclosure, adjacent ones of the antenna elements 302 may be isolated from each other by an amount, which may be at least 10 dB, at least 12 dB, at least 20 dB, or some other amount as specified. Further, adjacent or multiple ones of the antenna elements 302 may be energized simultaneously, with varying phase, frequency, and other offsets, to use superposition of the antenna beams for beam forming, beam steering, or other antenna beam shaping functions.

Figure 3C:
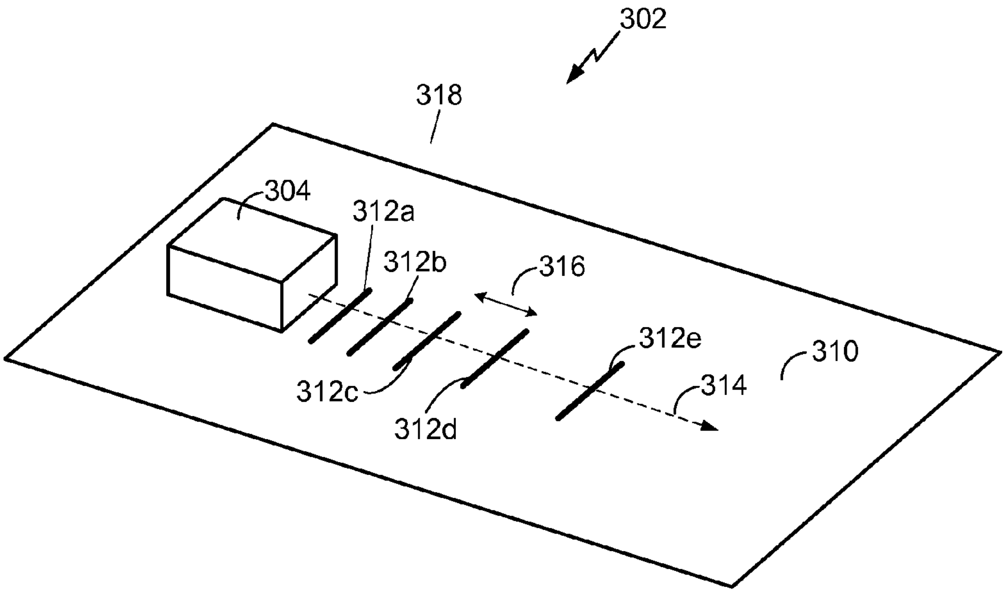

FIG. 3C illustrates an antenna element 302 in accordance with another aspect of the disclosure. Elements 312*a*-312*e* (collectively, elements 312), which may be one or more transverse grooves in the ground surface 310 and/or one or more conductive structures rising out of the ground surface 310, may be an alternative for or an addition to at least one of the pieces of dielectric material 306 (FIG. 3B). The one or more elements 312 launch (or receive) a signal wave 314 from the ground surface 310 in a similar fashion to the dielectric material 306 described with respect to FIG. 3B.

FIG. 3C also shows that a pitch 316, which is a distance between elements 312, may be varied within the antenna element 302 to achieve a desired beam pattern and/or gain for the antenna element 302. The pitch 316 may also vary between the antenna elements 302, i.e., the pitch 316 between a first antenna element 302 may be different than the pitch 316 for a separate antenna element 302 within the conformal antenna structure 300.

Figure 3D:
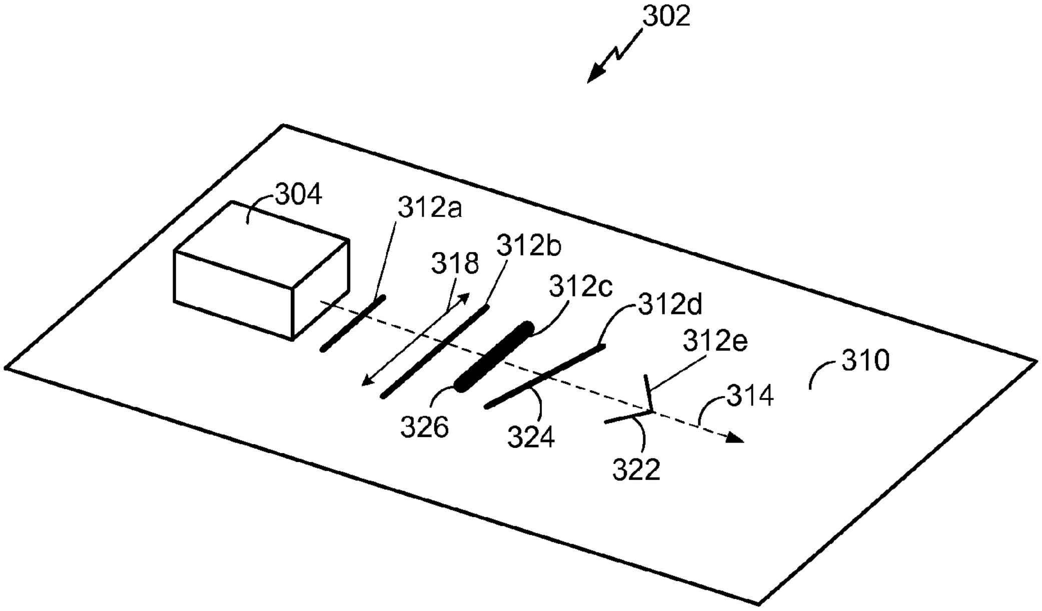

FIG. 3D illustrates that a length 318 (which may be referred to as a width of the element 312), a shape 322, an orientation 324, and a depth 326 (or height) of each element 312 may also be varied to create the desired beam pattern and/or gain for that particular antenna element 302. As an example, and not by way of limitation, the length 318 of the element 312*b* may be longer than the length of the element 312*a*. Further, the shape 322 of the element 312*e* may be different than that of the other elements 312*a-d*. The orientation 324 of the element 312*d* with respect to the feed waveguide 304 may be different than the orientation of other elements 312. The depth 326 (or height, if the element is a conductive structure) of the element 312*c* may be deeper into the ground surface 310 (or raised higher from the ground surface 310) than that of other elements 312. The pitch 316, the length 318, the shape 322, the orientation 324, and the depth 326 may be varied for each of the elements 312 to create a desired gain and/or beam pattern for each of the signal waves 314 launched or received from the feed waveguide 304. Each of the antenna elements 302 in the conformal antenna structure 300 may have a different beam pattern, and thus, each of the elements 312 in each of the antenna elements may have a different length 318, shape 322, orientation 324, and depth (or height) 326 within the conformal antenna structure 300 without departing from the scope of the present disclosure.

Figure 4:
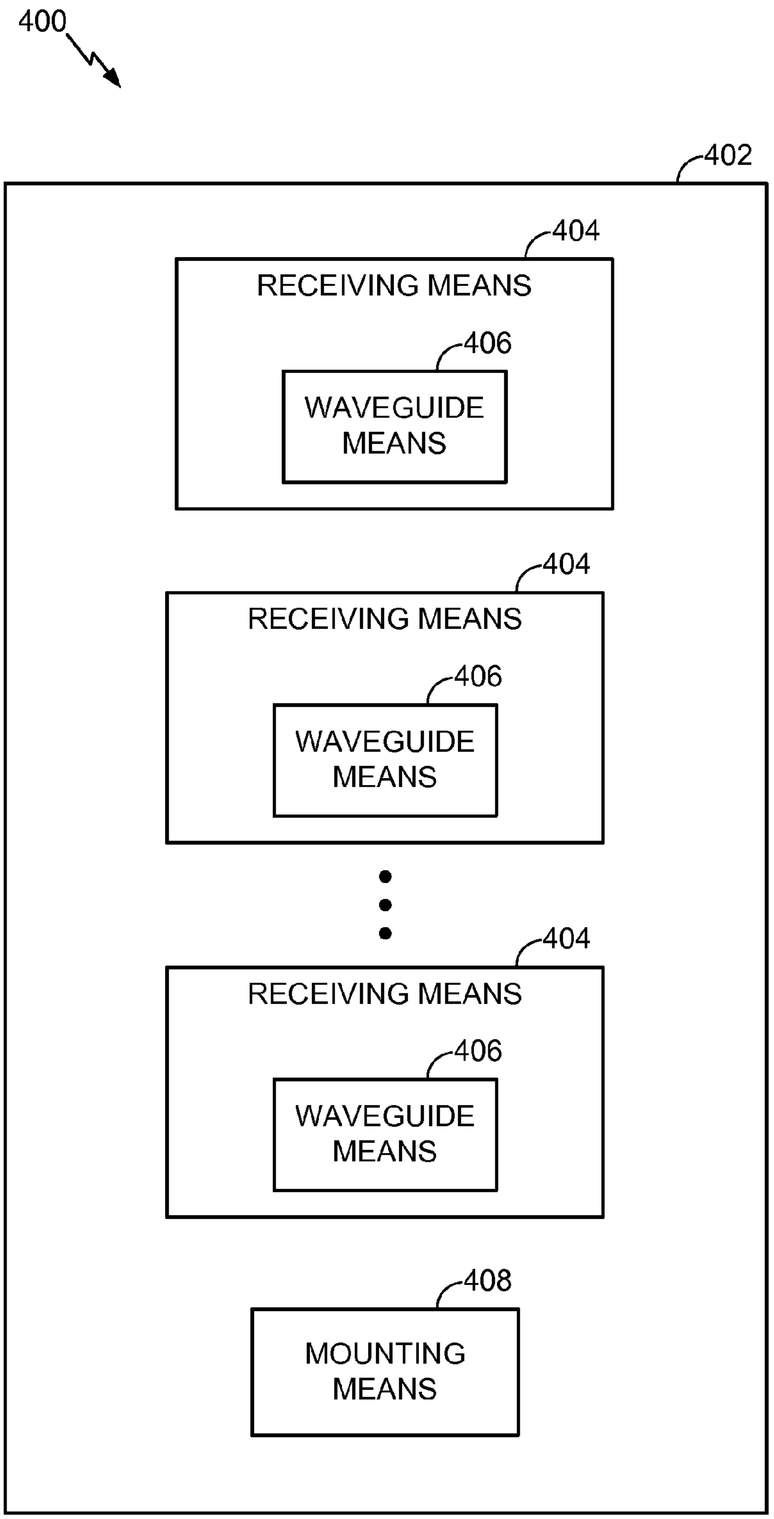
FIG. 4 illustrates a block diagram in accordance with an aspect of the present disclosure.

FIG. 4 illustrates a block diagram 400 of a low profile conformal high gain multi-beam aircraft antenna 402 in accordance with an aspect of the present disclosure. In this configuration, the low profile conformal high gain multi-beam aircraft antenna 402 includes means 404 for receiving a signal. The receiving means 404 are supported by a ground plane means for creating the low profile conformal high gain multi-beam aircraft antenna. At least one of the receiving means comprises a waveguide means 406 flared in at least one of an h-plane and a v-plane. The receiving means cooperate to create a gain pattern near a plane of the antenna. In one aspect of the disclosure, the receiving means may be antenna elements 302 or other means configured to perform the functions recited by the receiving means. In this configuration, the antenna also includes means 408 for mounting the low profile conformal high gain multi-beam aircraft antenna 402 to an aircraft. In one aspect of the disclosure, the mounting means may be the ground surface 310 or other means configured to perform the functions recited by the mounting means. In another aspect, the aforementioned means may be any module or any apparatus configured to perform the functions recited by the aforementioned means.

Within aspects of the present disclosure, adjacent antenna elements may be isolated from each other by an amount, which may be at least 10 dB, at least 12 dB, at least 20 dB, or some other amount as specified. Further, a transceiver may be coupled to each of the antenna elements, and the method in this aspect may include simultaneously accessing the antenna elements. Accessing adjacent antenna elements may be done to electronically scan a beam direction.

The antenna elements may be arranged in a substantially circular pattern on the ground plane, and may cover some portion of 360 degrees in an azimuth plane, 360 degrees in an azimuth plane, or more than 360 degrees in an azimuth plane. One or more of the antenna elements may be an outwardly extending dielectric, or an outwardly extending groove. At least one of a length of the outwardly extending dielectric/groove and a width of the outwardly extending dielectric/groove provide, at least in part, the gain pattern and/or the pattern shape of the antenna.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

A non-transitory computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

A computer program product in accordance with an aspect of the present disclosure is configured for wireless communication within a communications system using a low profile conformal high gain multi-beam aircraft antenna. The computer program product includes a non-transitory computer-readable medium having non-transitory program code recorded thereon. The non-transitory program code includes program code for creating a gain pattern near a plane of antenna elements supported by a ground plane of the low profile conformal high gain multi-beam aircraft antenna. At least one of the antenna elements is a feeding waveguide flared in an h-plane and/or a v-plane. The antenna elements cooperate to create the gain pattern near a plane of the antenna.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, in which reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A low profile conformal high gain multi-beam aircraft antenna comprising:

a ground plane; and a plurality of antenna elements supported by the ground plane to create the low profile conformal high gain multi-beam aircraft antenna, at least one of the plurality of antenna elements comprising a feeding waveguide flared in at least one of an h-plane and a v-plane, and a wave launching element disposed on a surface of the ground plane, wherein the feeding waveguide extends greater than the wave launching element in a direction transverse to the surface of the ground plane, and the plurality of antenna elements cooperate to create a gain pattern near a plane of the antenna.

2. The antenna of claim 1, in which the plurality of antenna elements are arranged in a substantially circular pattern on the ground plane, the plurality of antenna elements covering 360 degrees in an azimuth plane.

3. The antenna of claim 1, wherein the wave launching element comprises an outwardly extending dielectric.

4. The antenna of claim 3, in which at least one of a length of the outwardly extending dielectric and a width of the outwardly extending dielectric is configured to provide the gain pattern of the antenna.

5. The antenna of claim 3, in which at least one of a length of the outwardly extending dielectric and a width of the outwardly extending dielectric is configured to provide a pattern shape of the antenna.

6. The antenna of claim 1, wherein the wave launching element comprises at least one transverse element in the ground plane that transverses a launching direction of a signal wave.

7. The antenna of claim 6, in which the at least one transverse element is a groove.

8. The antenna of claim 6, in which the at least one transverse element is a conductive strip.

9. The antenna of claim 6, in which at least one of a length of the at least one transverse element, a width of the at least one transverse element, a depth of the at least one transverse element, a shape of the at least one transverse element, and an orientation of the at least one transverse element is configured to provide the gain pattern of the antenna.

10. The antenna of claim 6, in which at least one of a length of the at least one transverse element, a width of the at least one transverse element, a depth of the at least one transverse element, a shape of the at least one transverse element, and an orientation of the at least one transverse element is configured to provide a pattern shape of the antenna.

11. The antenna of claim 1, in which adjacent antenna elements are isolated from each other by at least 20 dB.

12. The antenna of claim 1, further comprising a transceiver coupled to each of the plurality of antenna elements, the transceiver operable to enable simultaneous access to the plurality of antenna elements.

13. The antenna of claim 12, in which adjacent elements are accessed to electronically scan a beam direction.

14. A low profile conformal high gain multi-beam aircraft antenna comprising:

means for receiving a signal comprising a plurality of antenna means, the means for receiving the signal is supported by a ground plane means for creating the low profile conformal high gain multi-beam aircraft antenna, at least one of the plurality of antenna means comprising feeding waveguide means flared in at least one of an h-plane and a v-plane, and a wave launching means disposed on a surface of the ground plane, wherein the feeding waveguide means extends greater than the wave launching means in a direction transverse to the surface of the ground plane, and the plurality of antenna means cooperate to create a gain pattern near a plane of the antenna.

15. The antenna of claim 14, in which the plurality of antenna means are arranged in a substantially circular pattern on the ground plane means, the plurality of antenna means covering 360 degrees in an azimuth plane.

16. The antenna of claim 14, in which adjacent ones of the plurality of antenna means are isolated from each other by at least 20 dB.

17. The antenna of claim 14, further comprising means for enabling simultaneous access to the receiving means.

18. The antenna of claim 17, in which adjacent ones of the plurality of antenna means are accessed to electronically scan a beam direction.

19. A method for wireless communication within a communications system using a low profile conformal high gain multi-beam aircraft antenna, the method comprising:

creating a gain pattern near a plane of a plurality of antenna elements supported by a ground plane of the low profile conformal high gain multi-beam aircraft antenna, at least one of the plurality of antenna elements comprises a feeding waveguide flared in at least one of an h-plane and a v-plane, and a wave launching element disposed on a surface of the ground plane, wherein the feeding waveguide extends greater than the wave launching element in a direction transverse to the surface of the ground plane, and the plurality of antenna elements cooperate to create the gain pattern near a plane of the antenna.

20. The method of claim 19, further comprising isolating adjacent antenna elements from each other by at least 20 dB.

21. The method of claim 19, in which a transceiver is coupled to each of the plurality of antenna elements, the method further comprising simultaneously accessing the plurality of antenna elements using a respective transceiver.

22. The method of claim 19, further comprising accessing adjacent antenna elements to electronically scan a beam direction.

23. The method of claim 19, in which the plurality of antenna elements are arranged in a substantially circular pattern on the ground plane, the plurality of antenna elements covering 360 degrees in an azimuth plane.

24. A computer program product configured for wireless communication within a communications system using a low profile conformal high gain multi-beam aircraft antenna, the computer program product comprising:

a non-transitory computer-readable medium having non-transitory program code recorded thereon, the non-transitory program code comprising:

program code to create a gain pattern near a plane of a plurality of antenna elements supported by a ground plane of the low profile conformal high gain multi-beam aircraft antenna, in which at least one of the plurality of antenna elements comprises a feeding waveguide flared in at least one of an h-plane and a v-plane, and a wave launching element disposed on a surface of the ground plane, wherein the feeding waveguide extends greater than the wave launching element in a direction transverse to the surface of the ground plane, and the plurality of antenna elements cooperate to create the gain pattern near a plane of the antenna.

25. The antenna of claim 1, in which the ground plane is conformal to a body of a vehicle.

26. The antenna of claim 1, in which a height of the plurality of antenna elements is less than 0.4 inch.

27. The antenna of claim 1, in which a radio frequency choke is positioned at a distance from an end of the wave launching element such that the antenna beam pattern is formed in a conformal manner.

28. The antenna of claim 3, wherein the wave launching element further comprises at least one transverse element in the ground plane.

29. The antenna of claim 1, wherein the wave launching element furthest from the feeding waveguide is separated from an end of the ground plane furthest from the feeding waveguide by a distance to define a desired antenna beam pattern for the feeding waveguide.

30. The antenna of claim 29, in which the at least one wave launching element comprises an outwardly extending dielectric.

31. The antenna of claim 29, in which the at least one wave launching element comprises at least one transverse element in the ground plane absent a dielectric material on the ground plane.

32. The antenna of claim 1, wherein the feeding waveguide for adjacent antenna elements are spaced apart from each other.

33. The antenna of claim 1, wherein the wave launching element of adjacent antenna elements are spaced apart from each other.

34. The antenna of claim 1, wherein the wave launching element comprises a plurality of transverse elements in the ground plane, and a distance between two adjacent transverse elements are different from that of other adjacent transverse elements.

35. The antenna of claim 1, wherein a top surface of the wave launching element is substantially planar and parallel to the surface of the ground plane.

* * * * *